(12) United States Patent
Abbas et al.

(10) Patent No.: US 6,369,716 B1
(45) Date of Patent: Apr. 9, 2002

(54) SYSTEM AND METHOD FOR CONTROLLING AIR QUALITY IN A ROOM

(75) Inventors: Mustafa Abbas, Wauwatosa; John E. Seem, Glendale, both of WI (US); Bernard Philippe Nicolas Clement, Bailleau le Pin (FR)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/728,232

(22) Filed: Dec. 1, 2000

(51) Int. Cl.[7] ............................................... G08B 17/10
(52) U.S. Cl. ...................... 340/632; 340/628; 340/532; 340/606
(58) Field of Search ................................. 340/632, 606, 340/628, 532, 539, 533, 584

(56) References Cited

U.S. PATENT DOCUMENTS

| | | |
|---|---|---|
| 5,355,305 A | 10/1994 | Seem et al. ................. 364/161 |
| 5,414,640 A | 5/1995 | Seem |
| 5,457,963 A * | 10/1995 | Cahill-O'Brien et al. ...... 62/78 |
| 5,506,768 A | 4/1996 | Seem et al. ................. 364/161 |
| 5,867,384 A | 2/1999 | Drees et al. |
| 6,006,142 A | 12/1999 | Seem et al. |
| 6,124,795 A * | 9/2000 | Bernau et al. .............. 340/628 |

* cited by examiner

Primary Examiner—Edward Lefkowitz
(74) Attorney, Agent, or Firm—Foley & Lardner

(57) ABSTRACT

A system and method of controlling air quality within a room. The method includes determining a first discharge air temperature setpoint based upon a room temperature setpoint and a first value indicative of an air temperature within the room, and determining a first air flow control signal based upon the first discharge air temperature setpoint and a second value indicative of an air temperature of discharge air being provided into the room. The method further includes controlling an air flow device based upon the first air flow control signal, and maintaining a heating device employed to influence the air temperature of the discharge air at a maximum heating level. The method additionally includes monitoring a level of carbon dioxide within the room to determine whether the level is below a predetermined threshold.

20 Claims, 3 Drawing Sheets

HEATING STATE

LOW LIMIT STATE

SYSTEM AND METHOD FOR CONTROLLING AIR QUALITY IN A ROOM

FIELD OF THE INVENTION

The present invention relates generally to the implementation of heating, ventilation and air conditioning (HVAC) systems for controlling the air quality within one or more rooms of a building. In particular, the present invention relates to the control of HVAC systems to maintain air quality within desired temperature and carbon dioxide level parameters.

BACKGROUND OF THE INVENTION

Heating, ventilation and air-conditioning (HVAC) systems are widely used to control the air quality within rooms of buildings. A variety of different parameters concerning the air quality can be controlled. Two commonly controlled parameters include the air temperature within the room(s) and the carbon dioxide ($CO_2$) levels within the room(s).

In typical HVAC systems, air quality within a room is controlled by mixing some fresh air (outside air) with some return air (existing room air), heating or cooling the mixture, and then providing that heated or cooled mixture back to the room as discharge air. Control of the ratio of the fresh air component to the return air component within the room is a key mechanism for controlling air quality.

With respect to controlling the $CO_2$ levels within a room, the number of people in a room is the major source of $CO_2$ generation. HVAC systems that employ Demand Control Ventilation (DCV) vary the amount of fresh air provided to the room in order to maintain the $CO_2$ at or below desired levels, despite changes in the number of occupants within the room.

The proportion of fresh air within the discharge air can also be varied to influence the room temperature.

For example, when the fresh air temperature is lower than an economizer switch-over temperature setpoint, additional fresh air can be added to the return air to reduce the overall temperature of the discharge air and the room.

Although the relative mixture of the fresh air and return air components in the discharge air can be varied widely to control temperature and $CO_2$ levels, the temperature of the discharge air cannot be reduced below a certain low limit without reducing the comfort of occupants within the room or causing excessive down draft. Consequently, the HVAC system typically must monitor the temperature of the discharge air and make sure that it does not fall too low.

Under many circumstances, an HVAC system can control (or at least influence) both the temperature of a room and the $CO_2$ levels within the room simultaneously by varying the amount of fresh air being provided to the room. However, when $CO_2$ levels are high but outdoor temperatures are low, control of both parameters simultaneously can become difficult. Because $CO_2$ levels are high, presumably because of a high number of occupants within the room, a greater amount of fresh air is desirable to reduce the $CO_2$ levels. At the same time, because the outdoor temperatures are low, large amounts of fresh air can overly reduce the discharge air temperature and create discomfort for the occupants.

More specifically, as long as the HVAC system is able to sufficiently heat the mixture of the fresh air and the return air to keep the discharge air temperature from falling below a desired discharge air temperature (DAT) setpoint, desired control of both the room temperature and the $CO_2$ levels is possible. However, if the discharge air temperature falls below the DAT setpoint but the HVAC system is providing heat at or above its capacity, desired control of both the room temperature and the $CO_2$ levels is limited.

It would therefore be advantageous if an HVAC system and method were developed that enabled optimal control of the air quality within a room when (i) high levels of fresh air are desirable in order to reduce excessive $CO_2$ levels due to a large number of occupants in the room, and yet (ii) the fresh air temperature is sufficiently low that the HVAC system cannot provide sufficient heat to warm up the discharge air temperature to above a DAT setpoint. It would further be advantageous if such a HVAC system and method were still capable of providing optimal control of air quality under normal conditions, that is, under conditions where the HVAC system could provide sufficient heat to keep the discharge air temperature above the DAT setpoint. It would additionally be advantageous if, in order to implement such a system and method, major modifications to existing HVAC systems were not required.

SUMMARY OF THE INVENTION

The present inventors have discovered that a cascaded PI control loop control system and a $CO_2$ alarm can be provided within an HVAC system which prioritizes the action of the HVAC system in situations where desired control of both $CO_2$ levels and temperature levels within the room is limited as discussed above. Upon the occurrence of a situation in which the HVAC system is unable to provide any additional heating capacity, the HVAC system switches from a normal heating state to a low limit state.

In the low limit state, a low limit proportional integral (PI) control element provides a control signal to a fresh air damper to control the amount of fresh air being added to form the discharge air. The low limit PI control element bases its output upon the difference between the actual discharge air temperature and the discharge air temperature setpoint produced by a room PI control element, which in turn bases its output upon the difference between the actual room temperature and a room temperature setpoint. Also in the low limit state, the HVAC system continues to provide the maximum amount of heating possible. The HVAC system leaves the low limit state and returns to the normal state once the room $CO_2$ level falls below the $CO_2$ setpoint, such that a $CO_2$ alarm shuts off.

The present invention relates to a method of controlling air quality within a room. The method includes determining a first discharge air temperature setpoint based upon a room temperature setpoint and a first value indicative of an air temperature within the room, and determining a first air flow control signal based upon the first discharge air temperature setpoint and a second value indicative of an air temperature of discharge air being provided into the room. The method further includes controlling an air flow device based upon the first air flow control signal, and maintaining a heating device employed to influence the air temperature of the discharge air at a maximum heating level. The method additionally includes monitoring a level of carbon dioxide within the room to determine whether the level is below a predetermined threshold.

The present invention further relates to a system for controlling air quality within a room. The system includes a damper for controlling an amount of a first type of air to be combined with a second type of air to form an air mixture, and an air pathway to which the damper is coupled, and within which the first and second types of air are combined to form the air mixture. The system additionally includes a coil assembly including a coil that is positioned within the air pathway and a valve, the coil affecting a temperature of the air mixture before the air mixture is output to the room as discharge air. The system further includes a controller coupled to the damper and to the valve, the controller providing first and second control signals respectively thereto. The controller operates in at least a first state and a second state, wherein in the first state the first and second control signals are varied to allow for the control of both an air temperature and a carbon dioxide level within the room, and in the second state the second control signal is maintained at a fixed level.

The present invention additionally relates to a system for controlling the air quality within a room. The system includes a first means for regulating an amount of air being added to the room, a second means for influencing the temperature of the air being added to the room, and a third means for controlling the operation of, and coupled to, the first and second means. The third means operates in at least a first control state and a second control state. In the first control state, the third means can control the first and second means so that both a temperature of the air within the room and a carbon dioxide level within the room are within desired ranges. In the second control state, the third means can control the first means so that at least the temperature of the air within the room is within a desired range.

DETAILED DESCRIPTION OF THE INVENTION

Figure 1:
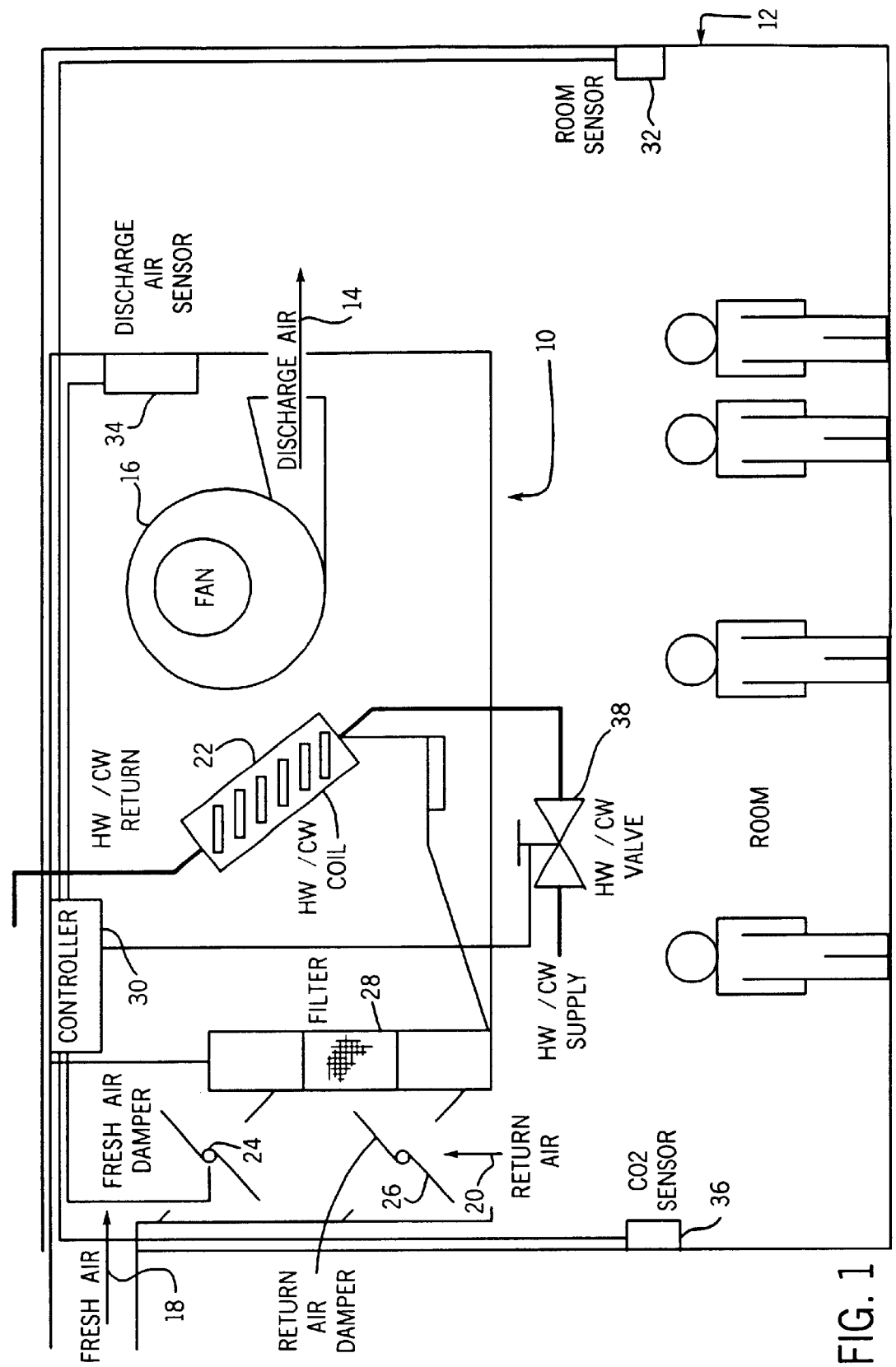
FIG. 1 is a schematic diagram of a heating, ventilation and air-conditioning (HVAC) system being used to control the air quality and climate within a room.

Referring to FIG. 1, a HVAC unit 10 that is employed to control the air quality in a room 12 pumps discharge air 14 into the room by way of a fan 16. The discharge air 14 is typically a mixture of fresh air 18 (outside air) and return air 20 (existing room air) that has been filtered by a filter 28 and then heated or cooled by way of a hot water/chilled water (HW/CW) coil 22. The relative amounts of fresh air 18 and return air 20 that comprise the discharge air 14 are respectively controlled by the position of a fresh air damper 24 and a return air damper 26. The dampers 24,26 are usually mechanically or otherwise coupled to one another so that the dampers are coordinated in their movement. Although in most circumstances, fresh air 18 is mixed with return air 20, in certain circumstances, the discharge air 14 includes only one of fresh air 18 or return air 20.

By combining fresh air 18 with return air 20 in order to produce the discharge air 14, CO2 and other contaminants within the return air 20 are diluted. Additionally, depending upon the desired room temperature and the existing room temperature within the room, fresh air 18 is also in some cases mixed with the return air 20 in order to contribute to the heating or cooling of the air within the room 12. For example, when the existing room temperature is higher than the desired room temperature, and the fresh air temperature is lower than an economizer switch-over temperature setpoint, the fresh air 18 can be added to the return air 20 to reduce the overall temperature of the room without additional cooling action by the HW/CW coil 22. In these ways, control of the relative amounts of fresh air 18 and return air 20 allows for the maintaining of the indoor air quality (IAQ) of the room 12.

Typically, the operation of the HVAC unit 10 is controlled by a controller 30 that is part of or coupled to the HVAC unit. The controller 30 receives indications of the temperature of the room 12 from a room sensor 32, indications of the temperature of the discharge air 14 from a discharge air sensor 34, and indications of the CO2 levels within the room 12 from a CO2 sensor 36. Based upon these indications, as well as other information concerning a desired room temperature ("room temperature setpoint") and desired CO2 levels ("CO2 setpoint") within the room 12, the controller 30 provides control signals which determine the positions of the fresh air damper 24 and the return air damper 26 and thereby determine the relative mixture of fresh air 18 and return air 20 within the discharge air 14. The controller 30 further provides control signals to control the operation of a HW/CW valve 38 which determines the amount of hot or chilled (cold) water provided to the HW/CW coil 22 and thereby controls the heating and cooling action of the HW/CW coil.

Figure 2:
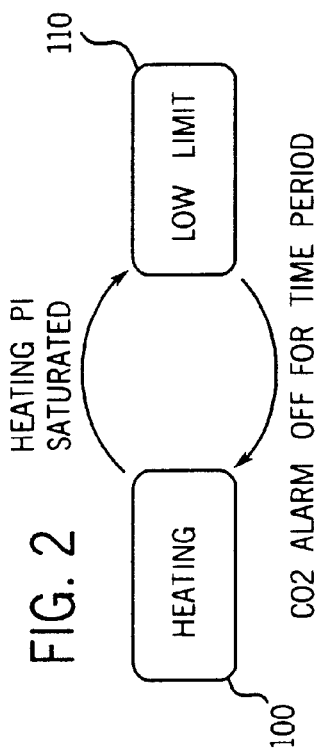
FIG. 2 is a state diagram showing two states of operation of the HVAC system of FIG. 1, namely a heating state and a low limit state, and the transition of the HVAC system between those two states.

Referring to FIG. 2, the system of FIG. 1 operates in at least two states, a normal heating state 100 and a low limit state 110. The controller 30 operates differently depending on whether it is in the heating state 100 or the low limit state 110, as shown in the block diagrams of FIGS. 3 and 4, which are discussed below. The two transition points between the two states are set so that there is smooth transitioning between the heating state 100 and the low limit state 110.

As shown in FIG. 2, the controller 30 switches from the heating state 100 to the low limit state 110 when a heating proportional integral (PI) control element 56 (see FIG. 3) employed by the controller 30 in the heating state is saturated high, that is, the output of the heating PI control element remains at (or above) its maximum value for a saturation time period. The length of the saturation time period is adjustable, and in one embodiment is two minutes. The requirement that the heating PI control element 56 remain at its maximum value for the saturation time period before the controller 30 switches from the heating state 100 to the low limit state 110 prevents the system from leaving the heating state 110 merely as a result of instantaneous (or very short) periods of maximization of the heating output of the system.

The heating PI control element 56 typically becomes saturated high in situations where both the temperature of the fresh air 18 is low and the CO2 level within the room 12 is high (presumably because a large number of occupants are within the room). In such situations, the system attempts to bring in larger amounts of the cold fresh air 18 to reduce CO2 levels, but then must compensate for the coldness of the fresh air by providing additional heating of the mixture of the fresh air and the return air 20.

When the output of the heating PI control element 56 is saturated high, this is indicative that the HW/CW coil 22 is providing the maximum amount of heat possible. That is, the HW/CW valve 38 is supplying the maximum amount of hot water to the HW/CW coil 22 that is possible to heat the mixture of fresh air 18 and return air 20 used to produce the discharge air 14. Because the heating capacity of the system is at its maximum level when the heating PI control element is saturated high, the temperature of the discharge air 14 cannot be raised by further heating provided by the HW/CW coil 22, and the room temperature cannot be controlled if the temperature of the discharge air 14 falls further. Consequently, the controller 30 switches to a new state of operation, namely, the low limit state 110.

Figure 4:
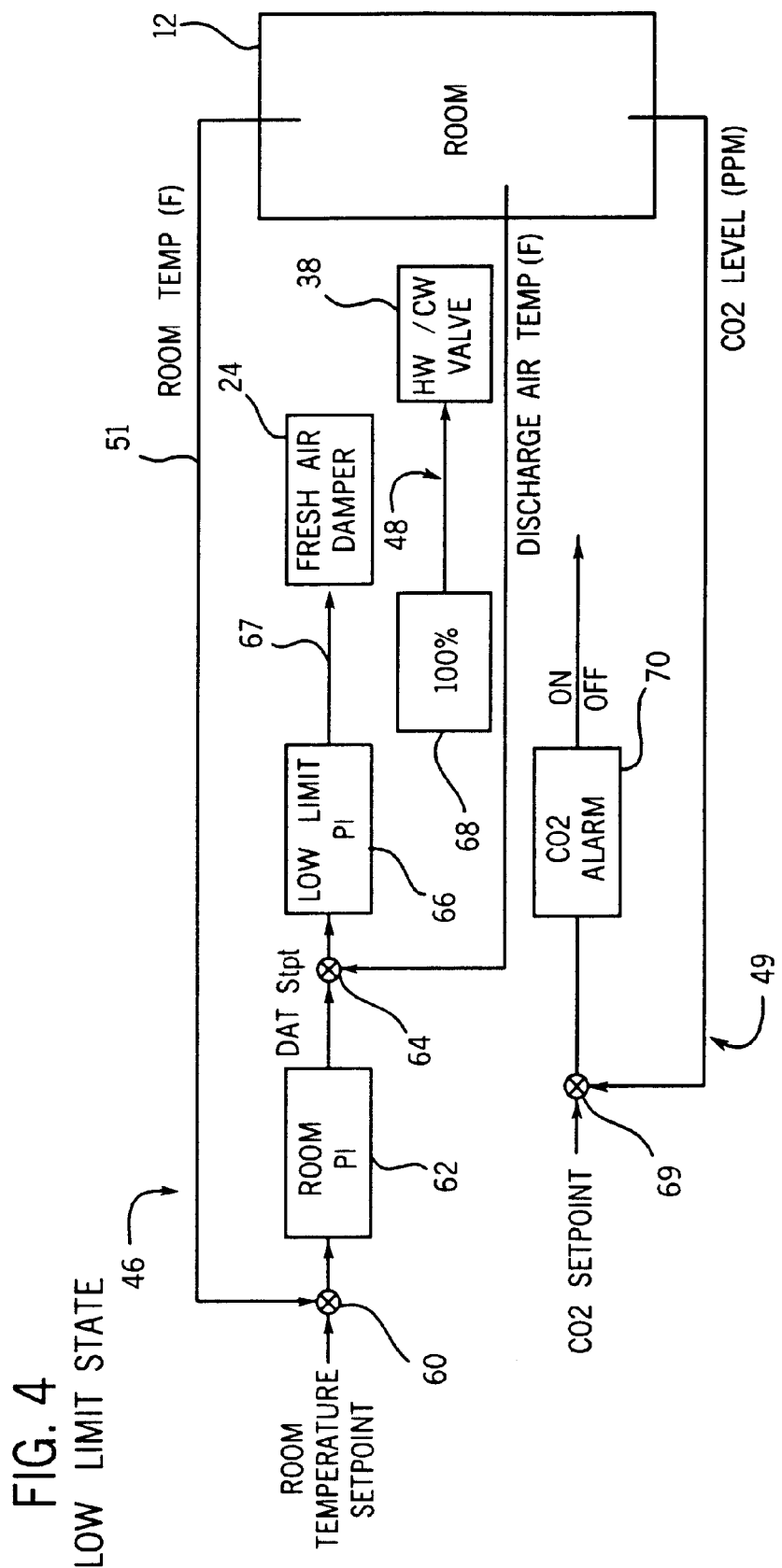
FIG. 4 is a block diagram showing operation of the HVAC system of FIG. 1 in the low limit state, in accordance with one embodiment of the present invention.

Once the controller 30 is in the low limit state 110, it only returns to the heating state 100 when it is determined that a CO2 alarm turns off and a low limit timer has timed out, as discussed further with respect to FIG. 4. When the CO2 alarm turns off, currently measured CO2 levels within the room 12 as measured by the CO2 sensor 36 are no longer higher than a CO2 setpoint. For the low limit timer to time out, the CO2 alarm must remain off (that is, the CO2 levels must remain at or below the CO2 setpoint) for a predetermined period of time, which in one embodiment is 15 minutes. Because the CO2 levels are less than (or equal to) the CO2 setpoint, less of the fresh air 18 is needed to be added to the discharge air 14 in order to dilute the existing CO2 within the return air 20. Consequently, the HW/CW coil 22 need not continue to provide maximum heat, and the system can operate in the heating state 100.

The shutting off of the CO2 alarm and timing out of the low limit timer is indicative of a situation in which the system can return to the "normal" heating state 100 because either the temperature of the fresh air 18 has risen or the CO2 levels are no longer excessive (presumably because the number of occupants in the room 12 has decreased), or both. That is, CO2 levels could have fallen below the CO2 setpoint either because the number of occupants in the room 12 has decreased, or because the temperature of the fresh air 18 has increased and consequently the system has been able to bring in a greater amount of fresh air and dilute the CO2 levels in the room.

Figure 3:
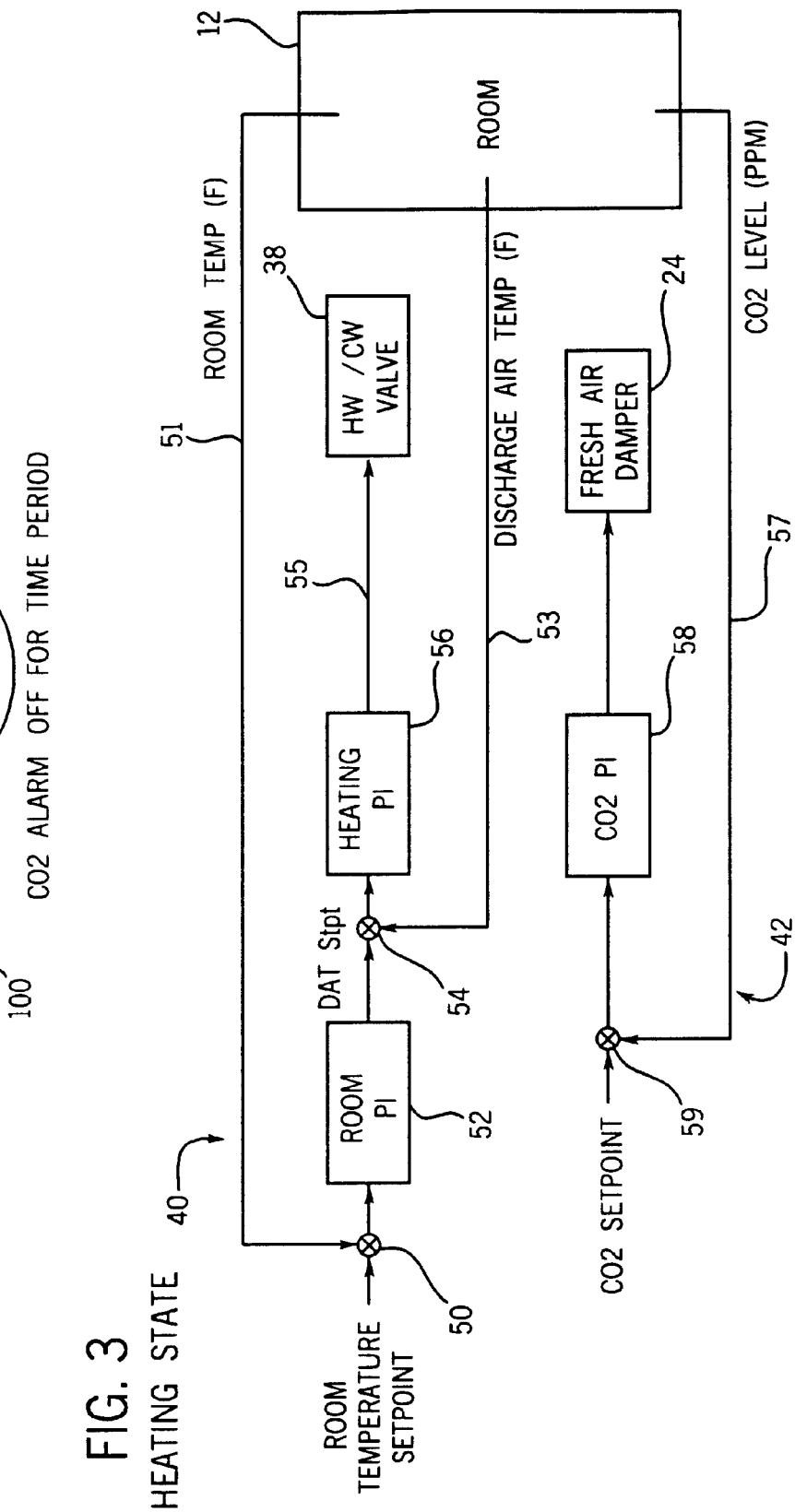
FIG. 3 is a block diagram showing operation of the HVAC system of FIG. 1 in the heating state.

Referring to FIG. 3, a block diagram concerning the operation of the controller 30 in the heating state 100 includes two control loops, a heating control loop 40 and a CO2 control loop 42. With respect to the heating control loop 40, the controller 30 provides a control signal 55 to the HW/CW valve 38 based upon a room temperature signal 51 from the room sensor 32, a discharge air temperature signal 53 from the discharge air sensor 34, and the room temperature setpoint, which may be stored in memory in the controller 30 or provided from another source that is coupled to the controller.

The control signal 55 provided to the HW/CW valve 38 is determined as follows. The controller 30, at a first comparator 50, determines a difference between the room temperature setpoint and the room temperature signal 51. This difference is provided to a room PI control element 52, which in turn provides the discharge air temperature (DAT) setpoint as its output. The DAT setpoint is compared at a second comparator 54 with the discharge air temperature signal 53 from the discharge air sensor 34. The difference between these two signals is provided from the second comparator 54 to the heating PI control element 56, which in turn provides the control signal 55 to the HW/CW valve 38. Therefore, the heating control loop 40 is actually a pair of cascaded control loops, the first generating the DAT setpoint based upon the room temperature signal 51 and the room temperature setpoint, and the second generating the control signal 55 based upon the discharge air temperature signal 53 and the DAT setpoint.

Further, with respect to the CO2 loop 42, the CO2 setpoint that is provided from memory or from some other location is compared at a third comparator 59 with a CO2 level signal 57 from the CO2 sensor 36. The difference between the CO2 setpoint and the CO2 level signal 57 is provided from the third comparator 59 to a CO2 PI control element 58, which then provides an output signal to control the positioning of the fresh air damper 24. Thus, in the heating state, the amount of fresh air 18 provided to the room 12 relative to the amount of return air 20 is determined based upon the CO2 levels in the room. In order to control the heat level in the room 12 in the heating state 100, the controller 30 controls the heating provided by the HW/CW coil 22. That is, the heating within the room is not controlled even in part by varying the relative proportions of the fresh air 18 and return air 20.

As discussed, if the output of the heating PI control element 56 is saturated high (at its maximum level), the controller 30 switches to the low limit state 110. In the low limit state 110, the controller 30 operates in accordance with FIG. 4. As shown, the controller 30 provides control of the fresh air damper 24 by way of an air control loop 46. Also, the controller 30 operates to provide a CO2 alarm output at a CO2 alarm branch 49 and maximum heating capacity at a heating control branch 48. The heating control branch 48 provides a 100% signal 68 to the HW/CW valve in order to maintain the output of the HW/CW valve 38 at its highest output.

Additionally, the fresh air damper 24 is controlled so that the amount of fresh air 18 being added to the discharge air 14 does not overwhelm the system. The fresh air damper 24 is controlled by a damper control signal 67 provided from the controller 30, which is determined as follows. The room temperature signal 51 from room sensor 32 is compared with the room temperature setpoint at a comparator 60 (which may be the same as comparator 50), the output of which is provided to a room PI control element 62 (which may be the same as the room PI control element 52). The output of the room PI control element 62 is a discharge air temperature (DAT) setpoint that is then compared against the discharge air temperature signal 53 from discharge air sensor 14 at a second comparator 64 (which may be the same as comparator 54). The output of the second comparator 64 is in turn provided to a low limit PI control element 66, which outputs the damper control signal 67 to the fresh air damper 24. Typically, the fresh air damper 24 is controlled to be less than its maximum open position in the low limit state. As with respect to the heating control loop 40 of FIG. 3, the air control loop 46 is made up of two cascaded control loops, the first generating the DAT setpoint and the second generating the damper control signal 67.

The CO2 level signal 57 provided by the CO2 sensor 36 is provided to a third comparator 69 (which may be the same as comparator 59) at which it is compared with the CO2 setpoint. The output of the third comparator 69 is provided to a CO2 alarm 70, which provides either an on or an off signal depending upon whether the CO2 levels within the room are excessive or are within a range of acceptable levels (e.g., below the CO2 setpoint), respectively. Although the output of the CO2 alarm 70 does not directly control any device within the HVAC unit 10, once the CO2 alarm continuously produces an off signal for the time out period of the low limit timer (shown as part of the CO2 alarm 70), the controller 30 returns to the heating state 100. Thus, the system remains in the low limit state 110 only as long as the CO2 levels are excessively high. The requirement that the CO2 alarm 70 remain off for the entire length of the time out period prevents the system from leaving the low limit state 110 merely as a result of short-term dips in the CO2 levels below the CO2 setpoint.

In alternate embodiments, the proportional integral (PI) control elements can be replaced with other types of control elements (e.g., proportional integral differential or "PID" control elements). Although the comparators 50, 54 and 59 employed in the heating state 100 need not be the same as the comparators 60, 64 and 69 of the low limit state 110, in certain embodiments these are the same elements. Likewise, the room PI control element 52 need not be the same as the room PI control element 62, although in certain embodiments this is the case. In the preferred embodiment all of the comparators, control elements, alarms, timers and other control elements described as part of the heating state 100 and low limit state 110 are embodied in software within the controller 30; however in other embodiments, these elements may be hardwired elements.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. A method of controlling air quality within a room, the method comprising:
   (a) determining a first discharge air temperature setpoint based upon a room temperature setpoint and a first value indicative of an air temperature within the room;
   (b) determining a first air flow control signal based upon the first discharge air temperature setpoint and a second value indicative of an air temperature of discharge air being provided into the room;
   (c) controlling an air flow device based upon the first air flow control signal;
   (d) maintaining a heating device employed to influence the air temperature of the discharge air at a maximum heating level; and
   (e) monitoring a level of carbon dioxide within the room to determine whether the level is below a predetermined threshold.

2. The method of claim 1, wherein the determining of the first discharge air temperature setpoint includes calculating a first difference between the first value and the room temperature setpoint at a first comparing device, and then processing the first difference at a first control element; and
   wherein the determining of the first air flow control signal includes calculating a second difference between the first discharge air temperature setpoint and the second value at a second comparing device, and then processing the second difference at a second control element.

3. The method of claim 2, wherein each of the first and second control elements is selected from the group consisting of a proportional integral control element and a proportional integral differential control element.

4. The method of claim 1, wherein the air flow device is a fresh air damper that determines an amount of fresh air that is combined with return air to form the discharge air, and wherein the heating device is a HW/CW coil.

5. The method of claim 1 wherein, when the level of carbon dioxide being monitored exceeds a carbon dioxide setpoint such that the level is above the predetermined threshold, an alarm is triggered.

6. The method of claim 1, further comprising:
   switching to a first state of operation when the level of carbon dioxide falls below the predetermined threshold and remains below the predetermined threshold for a time out period determined by a low limit timer.

7. The method of claim 6, wherein (a)–(e) are performed during a second state of operation.

8. The method of claim 7, further comprising:
   (f) determining a second discharge air temperature setpoint based upon the room temperature setpoint and a third value indicative of the air temperature within the room;
   (g) determining a heat control signal based upon the second discharge air temperature setpoint and a fourth value indicative of the air temperature of discharge air being provided into the room; and
   (h) controlling the heating device based upon the heat control signal;
   wherein, (f)–(h) are performed during the first state of operation.

9. The method of claim 8, further comprising
   (i) determining a second air flow control signal based upon the level of carbon dioxide in the room and a carbon dioxide setpoint; and
   (j) controlling the air flow device based upon the second air flow control signal.

10. The method of claim 9, switching to the second state of operation when the heat control signal is at a maximum level and remains at the maximum level for a saturation time period.

11. A system for controlling air quality within a room, the system comprising:
    a damper for controlling an amount of a first type of air originating outside the room to be combined with a second type of air originating inside the room to form an air mixture;
    an air pathway to which the damper is coupled, and within which the first and second types of air are combined to form the air mixture;
    a coil assembly including a coil that is positioned within the air pathway and a valve that controls an amount of heat transferred with respect to the coil, the coil affecting a temperature of the air mixture before the air mixture is output to the room as discharge air; and
    a controller coupled to the damper and to the valve, the controller providing first and second control signals respectively thereto,
       wherein the controller operates in at least a first state and a second state, wherein in the first state the first and second control signals are varied to allow for the control of both an air temperature and a carbon dioxide level within the room, and in the second state the second control signal is maintained at a fixed level.

12. The system of claim 11, wherein the controller switches from the first state to the second state when the second control signal attains a limit level.

13. The system of claim 12, wherein the first type of air is fresh air, the second type of air is return air, the coil is heating the air mixture, and the controller switches from the first state to the second state when the second control signal attains a saturation level causing maximum heating by the coil and remains at the saturation level for a saturation time period.

14. The system of claim 12, further comprising:
    a room sensor coupled to the controller and configured to provide a first signal to the controller, the first signal being indicative of the air temperature within the room;

a discharge air sensor coupled to the controller and configured to provide a second signal to the controller, the second signal being indicative of a discharge air temperature; and a carbon dioxide sensor coupled to the controller and configured to provide a third signal to the controller, the third signal being indicative of the carbon dioxide level within the room.

15. The system of claim 14, wherein the controller switches from the second state of operation to the first state of operation when the carbon dioxide level as indicated by the third signal falls below a second setpoint and remains below the second setpoint for a time out period.

16. The system of claim 14 wherein, in the second state of operation, the controller operates by way of a pair of cascaded control loops, wherein a first of the cascaded control loops determines the first setpoint by calculating a first difference between a room temperature setpoint and the first signal and then processing the first difference, and a second of the cascaded control loops determines the first control signal by calculating a second difference between the first setpoint and the second signal and then processing the second difference.

17. The system of claim 16, wherein the processing of the first and second differences is performed by way of a pair of respective proportional integral control elements.

18. The system of claim 16, wherein in the second state the controller further calculates a third difference between the third signal and a carbon dioxide setpoint, and the controller controls a status of an alarm based upon the third difference.

19. The system of claim 14, wherein in the first state of operation, the controller operates by way of a pair of cascaded control loops, and an additional control loop, wherein a first of the cascaded control loops determines the first setpoint by calculating a first difference between a room temperature setpoint and the first signal and then processing the first difference, and a second of the cascaded control loops determines the second control signal by calculating a second difference between the first setpoint and the second signal and then processing the second difference, and wherein the additional control loop determines the first control signal by calculating a third difference between the third signal and a carbon dioxide setpoint and then processing the third difference.

20. A system for controlling the air quality within a room, the system comprising:

a first means for regulating an amount of air being added to the room;

a second means for influencing the temperature of the air being added to the room; and a third means for controlling the operation of, and coupled to, the first and second means;

wherein the third means operates in at least a first control state and a second control state, wherein in the first control state the third means can control the first and second means so that both a temperature of the air within the room and a carbon dioxide level within the room are within desired ranges, and wherein in the second control state the third means can control the first means so that at least the temperature of the air within the room is within a desired range.

* * * * *